United States Patent
Dawoud

(10) Patent No.: US 10,404,669 B2
(45) Date of Patent: *Sep. 3, 2019

(54) WILDCARD SEARCH IN ENCRYPTED TEXT

(71) Applicant: Skyhigh Networks, Inc., Campbell, CA (US)

(72) Inventor: Hani T. Dawoud, San Jose, CA (US)

(73) Assignee: Skyhigh Networks, LLC, Campbell, CA (US)

( * ) Notice: Subject to any disclaimer, the term of this patent is extended or adjusted under 35 U.S.C. 154(b) by 754 days.

This patent is subject to a terminal disclaimer.

(21) Appl. No.: 14/808,850

(22) Filed: Jul. 24, 2015

(65) Prior Publication Data

US 2016/0366113 A1    Dec. 15, 2016

Related U.S. Application Data

(63) Continuation-in-part of application No. 14/734,880, filed on Jun. 9, 2015, now Pat. No. 10,176,207.

(51) Int. Cl.
*G06F 16/14* (2019.01)
*H04L 29/06* (2006.01)
(Continued)

(52) U.S. Cl.
CPC .......... *H04L 63/0471* (2013.01); *G06F 16/14* (2019.01); *G06F 16/31* (2019.01);
(Continued)

(58) Field of Classification Search
CPC ......... G06F 17/30864; G06F 17/30477; G06F 17/30539; G06F 16/951; G06F 2221/2107;
(Continued)

(56) References Cited

U.S. PATENT DOCUMENTS 8,930,691 B2    1/2015    Kamara et al.
9,047,480 B2    6/2015    Kahol et al.
(Continued)

OTHER PUBLICATIONS

Aswani et al. "Fuzzy keyword search over Encrypted Data using Symbol-based Trie-traverse Search Scheme in Cloud computing" Sep. 21, 2012, (hereafter Aswani).*
(Continued)

*Primary Examiner* — Jeff A Burke
*Assistant Examiner* — Cindy Nguyen
(74) *Attorney, Agent, or Firm* — Byrne Poh LLP

(57) ABSTRACT

A wildcard searchable encryption method enables wildcard search of encrypted text in a cloud-stored encrypted document. In some embodiments, the wildcard searchable encryption method is implemented in a network intermediary, such as a proxy server. The network intermediary encrypts documents on behalf of a user or an enterprise destined to be stored on a cloud service provider. The wildcard searchable encryption method performs keyword pre-processing of the document to be encrypted to generate a set of keyword-wildcard combinations in plaintext for some or all of the keywords in the document. The processed document is encrypted using an exact match searchable encryption algorithm. As a result of the encryption process, a search index is generated to include the keyword-wildcard combinations. As thus configured, the wildcard searchable encryption method enables wildcard search of the encrypted text, such as searches for prefixes or suffixes of the keywords.

20 Claims, 11 Drawing Sheets

(51) Int. Cl.
*G06F 21/62* (2013.01)
*H04L 9/06* (2006.01)
*G06F 16/31* (2019.01)
*G06F 16/33* (2019.01)

(52) U.S. Cl.
CPC .......... *G06F 16/33* (2019.01); *G06F 21/6227* (2013.01); *H04L 9/0637* (2013.01); *H04L 63/062* (2013.01); *H04L 63/0876* (2013.01); *G06F 2221/2107* (2013.01)

(58) Field of Classification Search
CPC .... G06F 16/148; G06F 16/14; G06F 16/2228; G06F 16/316; G06F 16/90335
See application file for complete search history.

(56) References Cited

U.S. PATENT DOCUMENTS

| | | |
|---|---|---|
| 9,454,673 B1 | 9/2016 | Sarukkai |
| 9,679,160 B1 | 6/2017 | Zhang |
| 2005/0177554 A1 | 8/2005 | Peltonen |
| 2010/0211781 A1 | 8/2010 | Auradkar |
| 2011/0004599 A1 | 1/2011 | Deninger |
| 2011/0004607 A1 | 1/2011 | Lokam |
| 2011/0119481 A1 | 5/2011 | Auradkar |
| 2012/0324240 A1 | 12/2012 | Hattori |
| 2013/0091357 A1 | 4/2013 | Moon |
| 2013/0148803 A1 | 6/2013 | Jho |
| 2013/0159695 A1 | 6/2013 | Chiueh |
| 2013/0262852 A1 | 10/2013 | Roeder |
| 2013/0262863 A1 | 10/2013 | Yoshino |
| 2013/0346424 A1 | 12/2013 | Zhang |
| 2014/0095889 A1 | 4/2014 | Araki |
| 2014/0149435 A1 | 5/2014 | Sisman |
| 2014/0214838 A1 | 7/2014 | Hendrey |
| 2014/0355756 A1 | 12/2014 | Iwamura |
| 2014/0359282 A1 | 12/2014 | Shikfa |
| 2015/0039886 A1 | 2/2015 | Kahol |
| 2015/0039887 A1* | 2/2015 | Kahol .................. G06F 21/6227 713/165 |
| 2015/0154418 A1 | 6/2015 | Redberg |
| 2015/0356314 A1* | 12/2015 | Kumar .............. G06F 17/30336 713/165 |

OTHER PUBLICATIONS

Gedam et al. "Fuzzy Keyword search over Encrypted Data in Cloud computing", Yogesh K. Gedam Int. Journal of Engineering Research and Applications www.ijera.com ISSN : 2248-9622, vol. 4, Issue 7( Version 3), Jul. 2014, pp. 197-202 (Year: 2014).*

Seny Kamara, "Encrypted Search," Research Paper, Accessed at http://research.microsoft.com/en-us/um/people/senyk/pubs/esearch. pdf, downloaded Jun. 2015.

David Cash et al., "Dynamic Searchable Encryption in Very-Large Databases: Data Structures and Implementation," Network and Distributed System Security (NDSS) Symposium, 2014.

David Cash et al., "Dynamic Searchable Encryption in Very-Large Databases: Data Structures and Implementation," http://www.internetsociety.org/sites/default/files/07_4_1.pdf, Feb. 26, 2014.

David Cash et al., "Highly-Scalable Searchable Symmetric Encryption with Support for Boolean Queries," 33th International Cryptology Conference (CRYPTO) 2013.

* cited by examiner

WILDCARD SEARCH IN ENCRYPTED TEXT

CROSS REFERENCE TO OTHER APPLICATIONS

This application is a continuation-in-part of U.S. patent application Ser. No. 14/734,880, entitled WILDCARD SEARCH IN ENCRYPTED TEXT, filed Jun. 9, 2015, which application is incorporated herein by reference for all purposes.

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

With cloud-based services coming into widespread use, data security for data and files stored on the cloud-based service providers become an important issue. In particular, cloud-based data storage has also come into widespread use. With more and more user data and files being stored in cloud-based data storage, data security for data and files stored on the cloud-based storage data has become an important issue.

BRIEF DESCRIPTION OF THE DRAWINGS

Various embodiments of the invention are disclosed in the following detailed description and the accompanying drawings.

DETAILED DESCRIPTION

Figure 1:
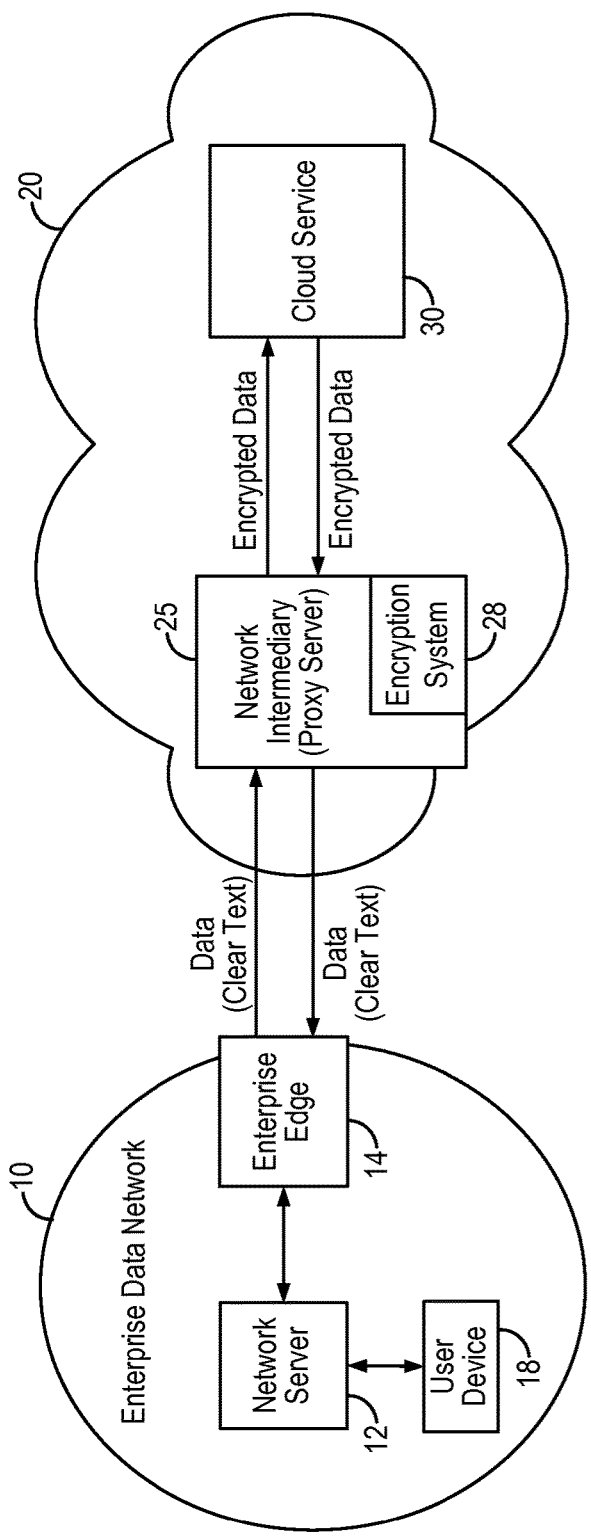
FIG. 1 is a block diagram illustrating a network intermediary implementing encryption of cloud data on behalf of an enterprise in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a wildcard searchable encryption method enables wildcard search of encrypted text in cloud-stored encrypted documents. In some embodiments, the wildcard searchable encryption method is implemented in a network intermediary, such as a proxy server. The network intermediary encrypts documents on behalf of a user or an enterprise destined to be stored on a cloud service provider. The searchable encryption method performs keyword pre-processing of each document to be encrypted to generate a set of keyword-wildcard combinations in plaintext for some or all of the keywords in the document. The set of keyword-wildcard combinations enables wildcard searching of at least some or all of the keywords in the document. The set of keyword-wildcard combinations is appended to the document and encrypted together with the document using an exact match searchable encryption algorithm. As a result of the encryption process, a search index is generated to include the keyword-wildcard combinations. As thus configured, the wildcard searchable encryption method enables wildcard search of the encrypted text including searches for prefix or suffix of the keywords. In some embodiments, the wildcard searchable encryption method realize wildcard searching of encrypted text in cloud-stored encrypted documents by using the search index stored on the network intermediary.

In the present description, the term "keyword" refers to any word in a document or a file or a data field and can include one or more characters of the English alphabet (lower case and uppercase letters), numbers 0-9, punctuation symbols, alphabet and symbols of languages other than English, and other ASCII characters. In the present description, the term "wildcard" refers to a character that will match any character or sequence of characters in a search.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, in the present description, "cloud content" or "cloud data" refers to data or files being processed or stored on a cloud-based service on behalf of an enterprise. The cloud-based service may be a cloud storage service, customer relationship management (CRM) services, information technology (IT) services or other types of cloud services. The cloud data or content may be stored as data files or in other formats.

With the proliferation of cloud-based services, an enterprise may wish to adopt one or more cloud-based services for data storage or other applications. Furthermore, the enterprise may deploy security measures to monitor and control the use of the cloud-based services from the enterprise's own private data network or by the enterprise's employees and users. In some cases, an enterprise data network redirects network traffic between a client device and a cloud-based service through a network intermediary. The client device may be situated within the enterprise data network or be associated with the enterprise. The network intermediary may provide monitoring and assessment of the enterprise's cloud usage. In some cases, the network intermediary is used to provide additional security function, such as encryption for uploaded data. For instance, the network intermediary may be used to provide encryption of sensitive data to be stored in a cloud service provider.

FIG. 1 is a block diagram illustrating a network intermediary implementing encryption of cloud data on behalf of an enterprise in some embodiments. Referring to FIG. 1, an enterprise may operate an enterprise data network 10 including one or more network servers 12 communicating with one or more user devices 18. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as a cloud service provider 30, that are deployed on the public data network 20. Network traffic from the user device 18 is sent to the network server 12 and travels to the enterprise network edge 14 and then onto the cloud service providers. Network traffic from the cloud service providers are received at the enterprise network edge 14 and then transmitted onto the network server 12 to be distributed to the user device 18.

To ensure security associated with the use of one or more cloud based services, the enterprise may redirect all network traffic destined for one or more cloud service providers through a network intermediary 25, which can be implemented as a network proxy server. In the present description, a proxy server refers to a server, which can be a computer system or a software application, that acts as an intermediary for requests from clients seeking resources from other servers. The network intermediary 25 may be configured as reverse/forward proxies. Thus, requests and data from the user device are intercepted by the network intermediary 25 before reaching the cloud service provider 30. In embodiments of the present invention, the network intermediary 25 performs encryption of the data before sending the data onto the cloud service. The cloud-based service may be a cloud storage service, customer relationship management (CRM) services, information technology (IT) services or other types of cloud services. In one embodiment, the network intermediary 25 is a cloud-based service and may be deployed on the publicly accessible Internet, such as public data network 20. In other embodiments, the network intermediary 25 may be deployed on a private data network of an enterprise, or be deployed on a third party private data network.

In the present description, the terms "file", "document" and "data" will be used interchangeably to refer to files or documents or data in any format that is being exchanged in the network environment described herein. "Data" as used herein can be structured data (emails, data records with name-value pairs) or unstructured data (word files, spreadsheet files). In the present example, the cloud-based service 30 may be a cloud storage service, such as Box.com or collaboration services, such as Office 365. The cloud-based service 30 may also be a customer relationship management (CRM) service, information technology (IT) service or other types of cloud services. The information being exchanged in the network environment described herein can include data of any format, such as files, documents, emails, or data records of a cloud based service.

More specifically, in the present description, each data object to be encrypted is treated as a "document." A document can be data of any format, including unstructured data such as a file, or structured data such as an email or a data record or a data field in a data record. In some examples, a data field in a data record may contain one or more keywords that can be encrypted and such data field will be treated as a "document" in the present description. In other examples, a data record may contain two or more data fields, of which a portion of the data fields can be encrypted. In that case, each data field that can be encrypted in the data record will be treated as a document. As an example, a data record can be an Event data record or a Contact data record in the cloud services provided by Salesforce.com.

In some embodiments, the network intermediary 25 performs encryption of data and files before sending the data and files onto the cloud service provider 30. Accordingly, in some embodiments, the network proxy server 25 includes an encryption system 28 which encrypts and decrypts file content based on one or more encryption algorithms. The content can be a file or a list of words from the file. The encryption system 28 may utilize keys, algorithms, pseudo random number generators and encoding algorithms suitable for encrypting the files from the user device. In some embodiments, the encryption system 28 may encrypt all or part of the data being transmitted to the cloud service provider.

As thus configured, a user in an enterprise data network 10, wishing to use a cloud-based data storage service provider 30 for storing data or files, uses a computing device 18 to access the cloud service provider 30. The user's request is redirected to the network proxy server 25 acting as the network intermediary. The network proxy server 25 may be configured as reverse/forward proxies. Thus, requests and files from the user are intercepted by the network proxy server 25 before reaching the cloud service provider 30. The data or files of the user are sent to the network proxy server 25 in clear text or plaintext. The network proxy server 25 performs, among other things, encryption of the data or files before sending the encrypted files or data onto the cloud service provider for storage. In this manner, data security is ensured as the data and files are stored on the cloud service provider 30 as encrypted data and any one accessing the cloud content on the cloud service provider directly will only see encrypted data. When the file or data is to be retrieved from the cloud service provider 30, the network intermediary 25 retrieves the file or data and also decrypts the file or data. The decrypted file or data is then provided to the user device 18 through the enterprise data network 10. With the use of the network intermediary 25 including the encryption system 28, the enterprise makes use of cloud based services with the security of the cloud data and content being encrypted at rest.

While file-level encryption ensures data security, encryption prevents the cloud stored data from being searched using the cloud service provider's native search routine. For example, cloud-based storage services typically provides search option where the stored files can be searched for keywords using the cloud service's native search routine and this search functionality will not work if the files are encrypted. Searchable encryption algorithms have been described which enables exact match searching in encrypted text. For example, Cash et al. described searchable encryption in the publications entitled "Highly-Scalable Searchable Symmetric Encryption with Support for Boolean Queries" and "Dynamic Searchable Encryption in Very-Large Databases: Data Structures and Implementation," published in CRYPTO 2013 and NDSS 2014, respectively, which publications are incorporated herein by reference in their entireties.

Figure 2:
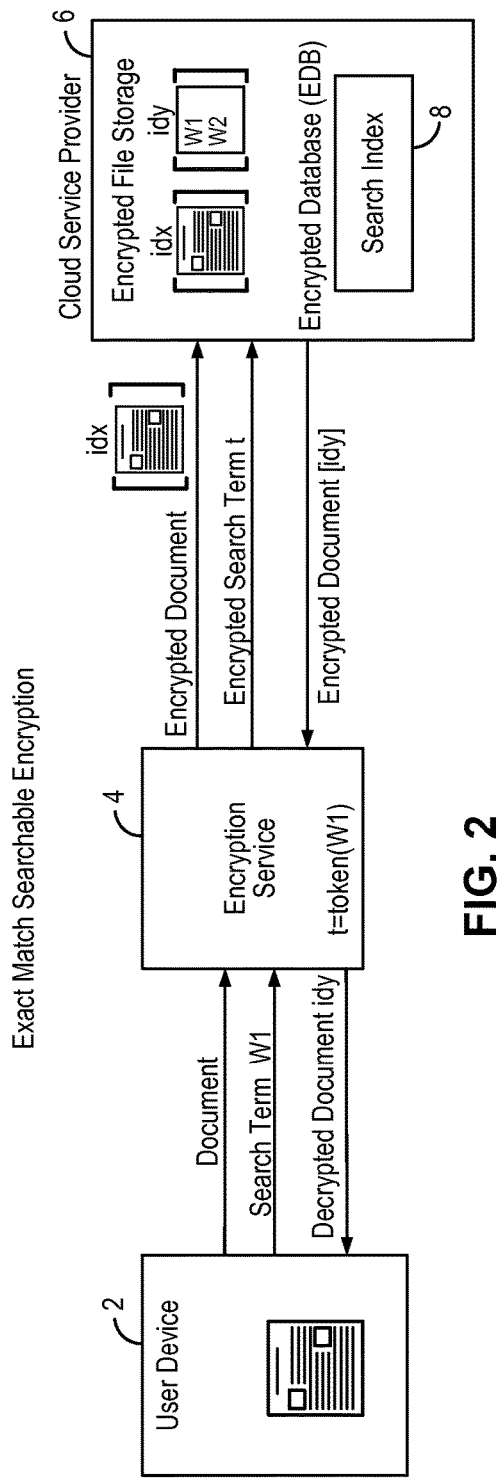
FIG. 2 illustrates the operation of an exact match searchable encryption algorithm in one example.

FIG. 2 illustrates the operation of an exact match searchable encryption algorithm in one example. Referring to FIG. 2, a user device 2 sends a document to be encrypted by an encryption service 4 implementing an exact match searchable encryption algorithm. The encryption service 4 encrypts the document and forwards the encrypted document to a cloud service provider 6 for storage. The encrypted documents stored in the cloud service provider are indexed by a document index (or document ID), such as idx and idy. The document can be encrypted using a bulk encryption algorithm, for example, AES-256. The encryption service 4 further uses the exact match searchable encryption algorithm to encrypt the document to generate an encrypted database (EDB) containing a search index 8 to enable the searching of the encrypted text in the encrypted documents. The search index contains a mapping of encrypted keyword labels to the encrypted document indexes and is also referred to as an encrypted index. To search for a keyword in the encrypted file storage, the user device 2 sends a search term W1 to the encryption service 4. The encryption service 4 encrypts the search term W1 using the exact match searchable encryption algorithm and generates a token t. The encryption service 4 sends the token t to the cloud service provider 6. The cloud service provider 6 can then use its native search routine to search for the token t in the encrypted documents (such as idx and idy). In particular, the cloud service provider 6 searches for the token t in the search index 8. In the event that the token t is found in the search index, the cloud service provider 6 returns the indexed document (e.g. idy) to the encryption service 4 for decryption. The encryption service 4 then decrypts the retrieved encrypted document (e.g. [idy]) provides the decrypted document (e.g. idy) to the user device 2 as the search result.

Figure 3:
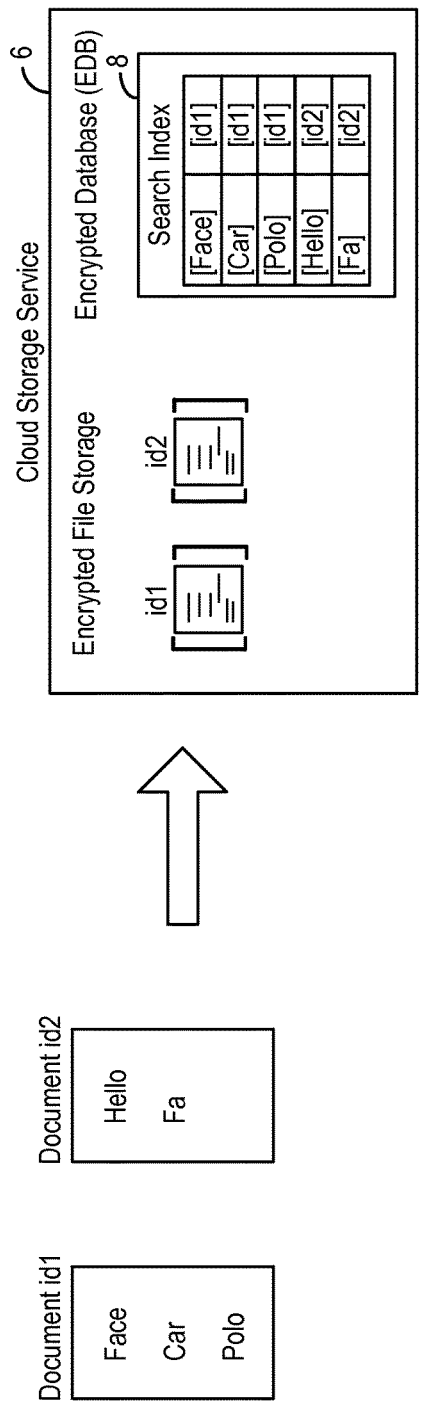
FIG. 3 further illustrates the operation of an exact match searchable encryption algorithm in some examples.

FIG. 3 further illustrates the operation of an exact match searchable encryption algorithm in some examples. In the present example, it is assumed that two documents are being encrypted by the exact match searchable encryption algorithm. The first document (document id1) includes the keywords "Face, Car and Polo" while the second document (document id2) includes the keywords "Hello and Fa". The two documents are encrypted using a bulk encryption algorithm and the encrypted documents [id1] and [id2] are stored in the encrypted file storage of the cloud service provider 6. In the present embodiment, a document or a keyword or a document index that is encrypted is illustrated as being enclosed in a square bracket "[ ]".

The two documents are then encrypted by the exact match searchable encryption algorithm to generate the search index 8 stored in the encrypted database (EDB). The search index 8 which includes a mapping of encrypted keyword labels to encrypted document indexes. For example, the encrypted keyword label "[Face]" is mapped to encrypted document index [id1] in the search index while the encrypted keyword label "[Hello]" is mapped to encrypted document index [id2] in the search index.

To search for a keyword in the encrypted documents, a search term is provided and the encryption service encrypts the search term using the exact match searchable encryption algorithm. The cloud service compares the encrypted search term with the encrypted keyword labels in the search index 8. A match is found only if there is an exact match between the encrypted search term and the encrypted keyword labels in the search index 8. When the exact match is found, the encrypted document index or indexes are returned. In this case, because the encryption for the word "Face" is different from the encryption for the word "Fa", a search request for the search term "Fa" or "Fa*" (where "*" denotes wildcard) will return only document id2 and not document id1 as the encrypted search term for "Fa" will not match exactly the encrypted keyword label for "Face" in the search index 8.

While searchable encryption algorithms have been described, these searchable encryption algorithms only allow for exact match searching. That is, the encrypted text can only be searched for an exact match search term. Wildcard searching, such as prefix or suffix searching, of encrypted text is not possible.

Figure 4:
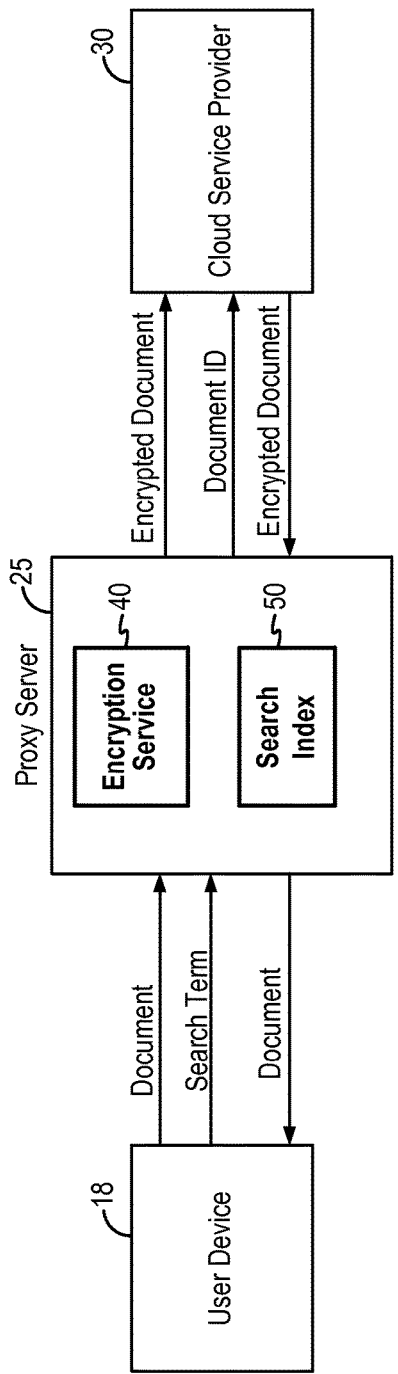
FIG. 4 illustrates the wildcard searchable encryption method implemented in a network intermediary in embodiments of the present invention.

In embodiments of the present invention, a wildcard searchable encryption method uses keyword pre-processing to enable wildcard search of encrypted text in cloud-stored encrypted documents. FIG. 4 illustrates the wildcard searchable encryption method implemented in a network intermediary in embodiments of the present invention. Referring to FIG. 4, in the present embodiment, the wildcard searchable encryption method is implemented in a proxy server 25 serving as a network intermediary between a user device 18 and a cloud service provider 30. The user device 18 may be associated with an enterprise data network. Documents (which can be files or data) sent by the user device 18 destined to the cloud service provider 30 are intercepted by the proxy server 25. The proxy server includes an encryption service 40 to encrypt documents on behalf of the user device so that documents are stored on the cloud service provider 30 being encrypted at rest. In some embodiments, the encryption service 40 may encrypt all or part of the document being transmitted to the cloud service provider. For example, the document may be a data record including a collection of data fields and the encryption service 40 encrypts some of the data fields but not other data fields in the data record. In accordance with embodiments of the present invention, the encryption service 40 implements the wildcard searchable encryption method of the present invention. Furthermore, the encryption service 40 is configured to generate an encrypted database (EDB) containing a search index 50 to enable the searching of the encrypted text in the encrypted documents.

In embodiments of the present invention, the encryption service 40 is configured to store a search index 50 on the proxy server 25 or with the proxy server 25, separate from the encrypted documents which are being stored on the cloud service provider 30. In conventional searchable encryption algorithms, the search index is typically co-located with the encrypted documents which in the present case is the cloud service provider 30. Searching of the encrypted files therefore takes place on the cloud service provider. However, the wildcard searchable encryption method of the present invention stores the encrypted database including the search index on or with the proxy server. That is, the search index is co-located with the proxy server 25. In this manner, searching of the encrypted documents is performed at the proxy server 25 using the search index 50 and the proxy server 25 retrieves the indexed document from the cloud service provider 30. Searching for documents at the cloud service provider is therefore avoided.

In some embodiments, the search index 50 is stored with the proxy server 25. In other embodiments, the search index 50 may be stored on a different physical machine from the proxy server 25 and communicates with the proxy server 25 over a network connection. The exact physical configuration of the proxy server and the search index is not critical to the practice of the present invention. The encryption service 40 and the search index 50 may be implemented on the same server or on different servers. Alternately, the encryption service 40 and the search index 50 may be formed as part of the proxy server 25 or on a separate server in communication with proxy server 25.

Referring to FIG. 4, the user device 18 sends a document to be stored on the cloud service provider 30. The proxy server 25 intercepts the document and passes the document to the encryption service 40 for encryption. The encryption service 40 encrypts the document and generates or updates the search index 50 as a result of encrypting the document. The encrypted document is then sent to the cloud service provider 30 for storage. More specifically, the encryption service 40 encrypts the document using an encryption algorithm, such as a bulk encryption algorithm. In some embodiments, the document is encrypted using a secret key K belonging to and known only by the user or the enterprise to which the user is associated. In one example, the encryption algorithm for encryption the document is an AES256-GCM authenticated encryption. The encryption service 40 further uses an exact match searchable encryption algorithm to encrypt a processed version of the document to generate an encrypted database (EDB) containing a search index 50 to enable the searching of the encrypted text in the encrypted documents. The generation of the processed version of the document will be described in more details below.

Figure 5:
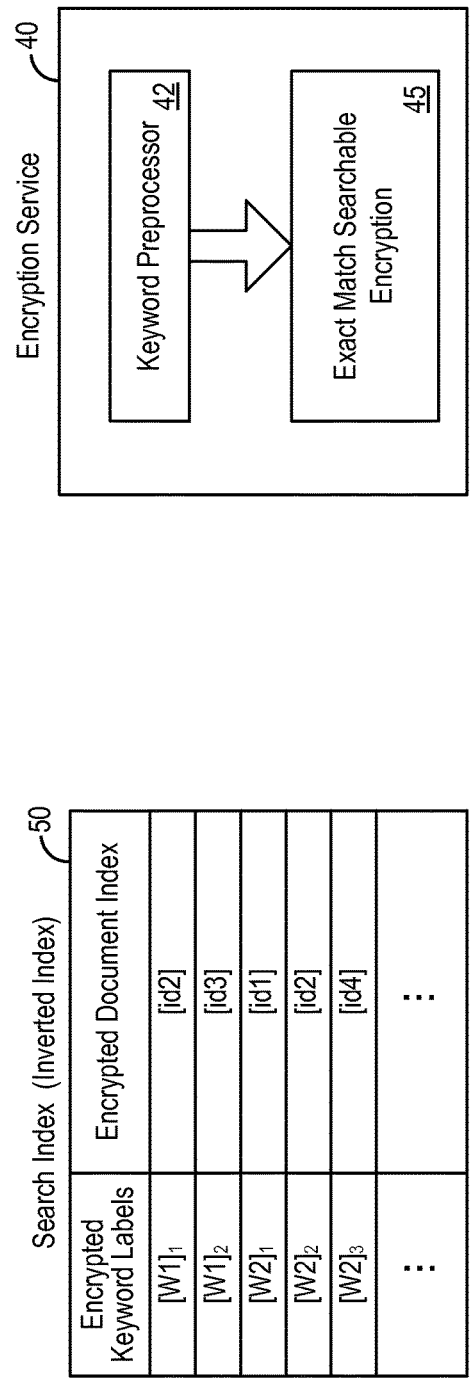
FIG. 5 illustrates a configuration of the search index in some embodiments.

FIG. 5 illustrates a configuration of the search index in some embodiments. Referring to FIG. 5, the search index 50 includes a mapping of encrypted keyword labels to encrypted document indexes. The search index 50 is sometimes referred to as an encrypted index or an encrypted search index. In each entry of the search index, an encrypted keyword label ($[W1]_1$, $[W2]_1$, . . . ) is mapped to an encrypted document index identifying the encrypted document containing the respective keyword (W1, W2, . . . ). For example, for keyword W1, the search index 50 includes an entry mapping an encrypted keyword label $[W1]_1$ to the encrypted document index id2.

Because each keyword may be associated with two or more documents, for security reason, each entry of the same encrypted keyword label [W1] in the search index is represented differently in the search index so as to avoid leaking information relating to the frequency of the keyword in the search index. More specifically, the search index 50 includes a first entry of the encrypted keyword label [W1] encoded with a counter value of 1, resulting in an encrypted keyword label of $[W1]_1$ in the first entry mapping to the encrypted document index id2. The counter value increments when there is a second document (id3) containing the same keyword W1. Hence, the search index 50 includes a second entry of the encrypted keyword label $[W1]_2$, encoded with the counter value of 2, mapping to the encrypted document index id3. The encrypted keyword labels $[W1]_1$ and $[W1]_2$, although both contain information relating to the keyword W1, have different encryption due to the counter value so that the encrypted keyword labels $[W1]_1$ and $[W1]_2$ are different encrypted values in the search index. The counter value 1, 2, and so on is shown explicitly in the encrypted keyword labels in FIG. 5 for illustrative purpose only. In actual implementation, the counter value of the encrypted keyword labels are encoded within the encrypted keyword label so that the counter value information is hidden and the search index does not reveal the word frequency for each keyword. In this manner, the search index 50 is protected from frequency analysis attack. An implementation for generating the search index 50 will be described below in more detail.

When the user wishes to perform a search of the encrypted documents stored on the cloud service provider 30, the user device 18 transmits a search term which is intercepted by the proxy server 25. The encryption service 40 encrypts the search term using the exact match searchable encryption algorithm to generate an encrypted search term. The encryption service 40 searches in the search index 50 for the encrypted search term. When the encrypted search term is matched exactly to an encrypted keyword label in an entry of the search index 50, the encrypted document index associated with the matched encrypted keyword label is retrieved. In practice, the encrypted search term is matched exactly to the encrypted keyword label in each entry of the search index 50 to retrieve all encrypted document indexes matching the encrypted search term. The search index may return one or more encrypted document index/indexes. The encrypted document index or indexes are decrypted and then sent to the cloud service provider 30 to retrieve the encrypted document(s). The encrypted document(s) are returned to the proxy server 25. The encryption service 40 decrypts the document(s) and provides the decrypted document(s) to the user device 18 as the search result.

Figure 6:
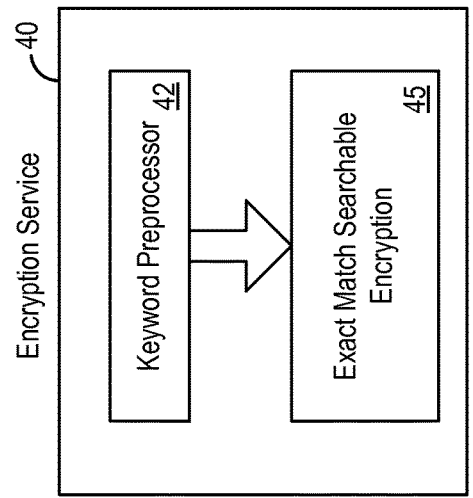
FIG. 6 is a block diagram of the encryption service 40 implementing the wildcard searchable encryption method in embodiments of the present invention.

In order to support wildcard searching of the encrypted text, the encryption service 40 implements the wildcard searchable encryption method of the present invention. FIG. 6 is a block diagram of the encryption service 40 implementing the wildcard searchable encryption method in embodiments of the present invention. Referring to FIG. 6, the encryption service 40 includes a keyword preprocessor module 42 configured to perform keyword pre-processing of the document to be encrypted to generate a set of keyword-wildcard combinations in plaintext for some or all of the keywords in the document. The set of keyword-wildcard combinations enables wildcard searching of at least some or all of the keywords in the document. The set of keyword-wildcard combinations is appended to the document to generate a processed document. The encryption service 40 further includes an exact match searchable encryption module 45 configured to encrypt the processed document using an exact match searchable encryption algorithm. Exact match searchable encryption algorithms are known and examples of exact match searchable encryption algorithms are described in the aforementioned papers by Cash et al.

Figure 7:
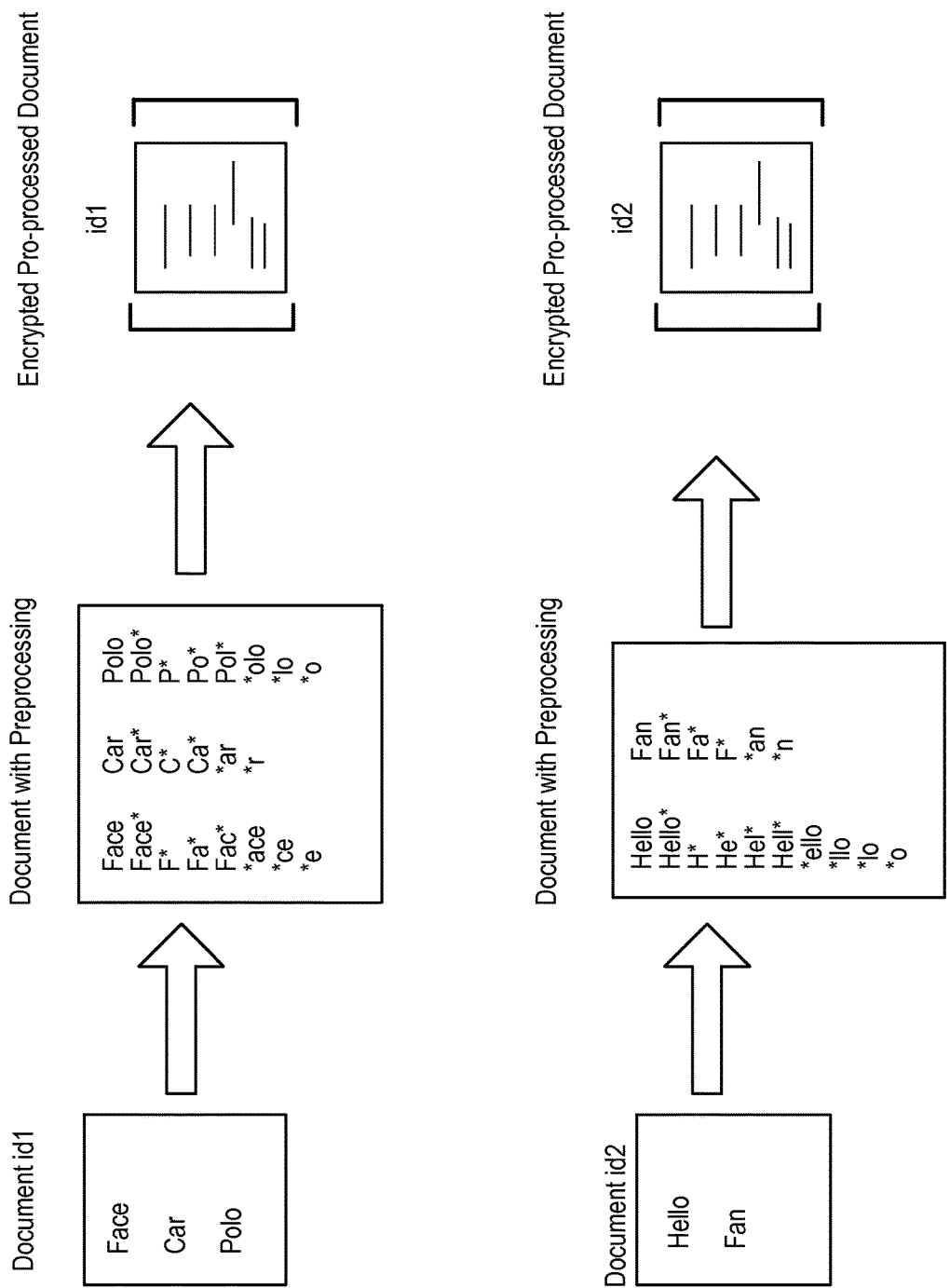
FIG. 7 illustrates the operation of the keyword preprocessor module in some examples.

More specifically, the keyword preprocessor module 42 parses the document to be encrypted and for at least some or all keywords in the document, the keyword preprocessor module 42 generates a set of keyword-wildcard combinations in plaintext for each keyword to enable wildcard searching of the keyword. In the present description, wildcard search of a keyword includes prefix search and/or suffix search of the keyword. For each keyword to be processed, the keyword preprocessor module 42 generates keyword-wildcard combinations including the leading one or more characters of the keyword, forming the prefixes of the keyword with the remaining character(s) being a wildcard. The keyword preprocessor module 42 may further generate keyword-wildcard combinations including the trailing one or more characters of the keyword, forming the suffixes of the keyword with the remaining character(s) being a wildcard. As a result, a set of keyword-wildcard combinations in plaintext for a keyword is generated to enable prefix or suffix search of the keyword. The set of keyword-wildcard combination for the subject keywords are appended to the document in plaintext. FIG. 7 illustrates the operation of the keyword preprocessor module in some examples. Referring to FIG. 7, a document id1 includes the keywords "Face," "Car," and "Polo" and a document id2 includes the keywords "Hello" and "Fa." In the present embodiment, the keyword preprocessing module processes the documents id1 and id2 to generate processed documents including keyword-wildcard combinations forming the prefixes and the suffixes of the keywords.

For example, for document id1, the keyword preprocessor module generates all the keyword-wildcard combinations forming prefixes of the keyword "Face". Thus, the keywords "Face*", "F*", "Fa*" and "Fac*" are generated. Furthermore, the keyword preprocessor module 42 generates all the keyword-wildcard combinations forming suffixes of the keyword "Face". Thus, the keywords "*ace", "*ce" and "*e" are generated. The same processing is applied to the keywords Car and Polo in document id1. The processed document includes the original keywords and the set of keyword-wildcard combinations. The entire processed document is encrypted using an exact match searchable encryption algorithm 45. In a similar manner, the keyword preprocessor module 42 generates the keyword-wildcard combinations forming prefixes and suffixes of the keywords "Hello" and "Fan" in document id2. The document id2 is also then encrypted using the exact match searchable encryption algorithm 45.

Figure 8:
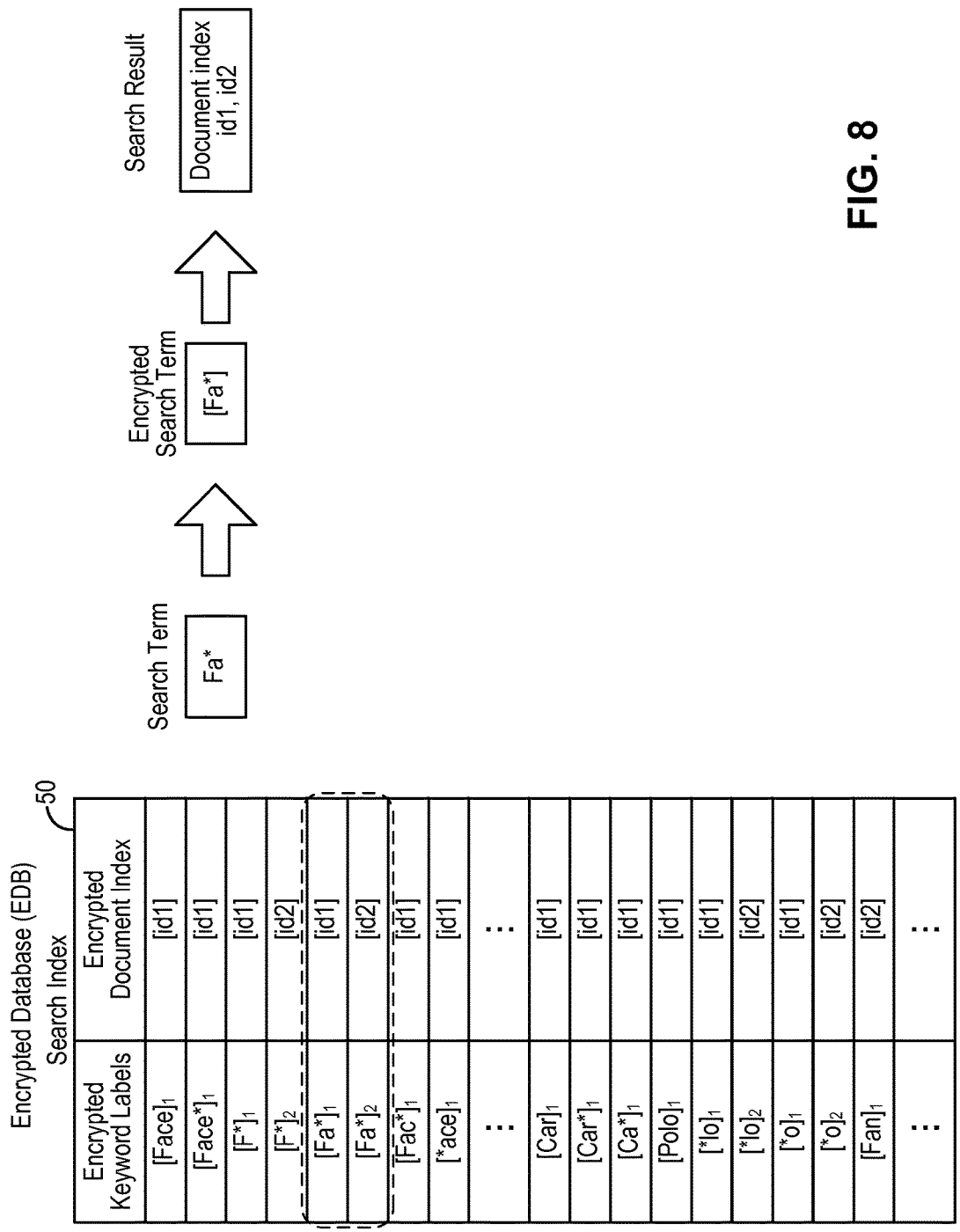
FIG. 8 illustrates the search index generated for the documents in FIG. 7.

With documents id1 and id2 thus processed and encrypted using the exact match searchable encryption algorithm 45, the encryption service 40 generates the search index 50 to include the mapping of encrypted keyword labels in the processed documents to the document IDs or document indexes of the processed documents. FIG. 8 illustrates the search index generated for the documents in FIG. 7. With documents id1 and id2 thus pre-processed, the processed documents in plaintext include the keywords and all the associated keyword-wildcard combinations. After encryption using the exact match searchable encryption algorithm 45, the search index is generated to include encrypted keywords from the original documents and encrypted keyword-wildcard combinations added by the keyword pre-processing. Each entry in the search index 50 includes an encrypted keyword label, which can be associated with a keyword or a keyword-combination in a processed document, mapping to an encrypted document index identifying the document containing the keyword or the keyword-combination. For example, the search index 50 includes an entry for the encrypted keyword label $[Face]_1$ mapped to an encrypted document index [id1]. The search index 50 further includes an entry for the encrypted keyword label $[Fa^*]_1$ mapping to an encrypted document index [id1] and an entry for the encrypted keyword label $[Fa^*]_2$ mapping to encrypted document index [id2]. The encrypted keyword labels $[Fa^*]_1$ and $[Fa^*]_2$ both refer to the same keyword Fa* but each is encoded with a different counter value so that the encrypted keyword labels are represented differently in the entries of the search index.

With the search index 50 thus generated to include encrypted keyword-wildcard combinations, wildcard search of the original keywords in the encrypted documents is enabled. For example, to search for all documents containing a word with the prefix "Fa", a search term for the prefix "Fa*" is provided. The encryption service 40 generates the encrypted search term labels $[Fa^*]_N$, which denotes the encrypted keyword [Fa*] encoded with the counter value N. The counter value N is incremented during the search of the search index. In the search index 50, the encrypted search term label $[Fa^*]_N$ is matched to two entries: a first entry $[Fa^*]_1$ mapped to document [id1] and a second entry $[Fa^*]_2$ mapped to document [id2]. The encrypted document indexes that matches the encrypted search term label are retrieved and decrypted. The proxy server 25 will then fetch the documents id1 and id2 from the cloud service provider as the search result. The operation of the exact match searchable encryption algorithm 45 will be described in more detail below.

In the instructive to note that without the pre-processing performed by the keyword preprocessor module, the search index 50 would not have contained the search term "Fa*" and a search of the term "Fa*" will only return document id2 containing the keyword "Fa" and not document id1 containing the keyword "Face". This is because the encryption for "Fa" and "Face" is different and the search index does not map the document id1 containing the keyword "Face" to the encrypted keyword "Fa" contained in document id2, without the keyword pre-processing performed herein by the keyword preprocessor module.

Figure 9:
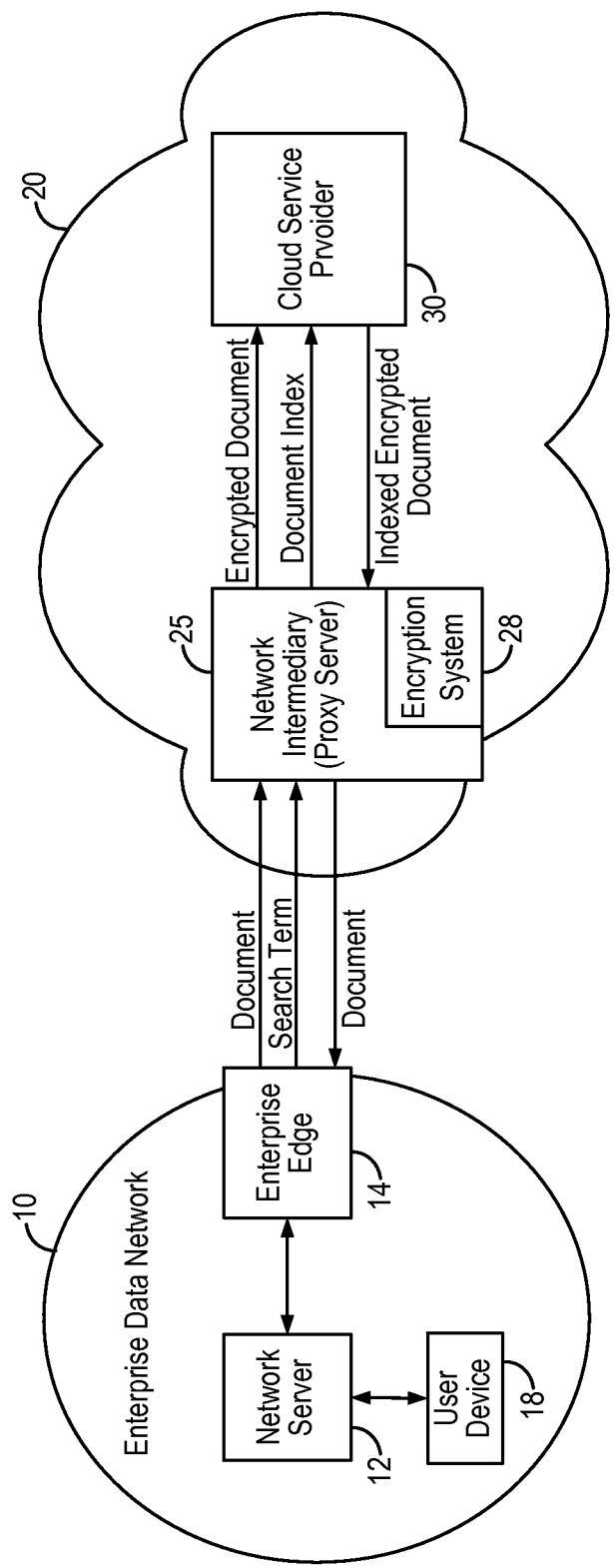
FIG. 9 is a block diagram illustrating a network intermediary implementing the wildcard searchable encryption of cloud data on behalf of an enterprise in some embodiments.

In embodiments of the present invention, the wildcard searchable encryption method is employed by an enterprise to perform encryption of the enterprise's cloud stored data so that users of the enterprise can perform wildcard search of the cloud stored data. FIG. 9 is a block diagram illustrating a network intermediary implementing the wildcard searchable encryption method of cloud data on behalf of an enterprise in some embodiments. Referring to FIG. 9, an enterprise may operate an enterprise data network 10 including one or more network servers 12 communicating with one or more user devices 18. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as cloud service provider 30, that are deployed on the public data network 20. Network traffic form the user device 18 is sent to the network server 12 and travels to the enterprise network edge 14 and then onto the cloud service providers. Network traffic from the cloud service providers are received at the enterprise network edge 14 and then transmitted onto the network server 12 to be distributed to the user device 18.

To ensure security associated with the use of one or more cloud based services, the enterprise may redirect all network traffic destined for one or more cloud service providers through a network intermediary 25, which can be implemented as a network proxy server. The network intermediary 25 may be configured as reverse/forward proxies. Thus, requests and data from the user device are intercepted by the network intermediary 25 before reaching the cloud service provider 30. In embodiments of the present invention, the network intermediary 25 performs encryption of documents (which can be data or files) before sending the documents onto the cloud service provider 30. The network proxy server 25 includes an encryption system 28 which encrypts and decrypts document content using the wildcard searchable encryption method of the present invention. In embodiments of the present invention, the network proxy server 25 implements the wildcard searchable encryption method 100 described in the flowchart of FIG. 10. In some embodiments, the encryption system 28 may encrypt all or part of the document being transmitted to the cloud service provider.

As described above, the proxy server 25 implementing the wildcard searchable encryption method 100 generates a search index that enables wildcard encrypted search of encrypted documents. The search index is co-located with the proxy server 25, instead of being located on the cloud service provider 30. In some embodiments, the search index is stored on the proxy server 25. In other embodiments, the search index may be stored on a different physical machine from the proxy server 25 and communicates with the proxy server 25 over a network connection. The exact physical configuration of the proxy server and the search index is not critical to the practice of the present invention. The search index may be formed as part of the proxy server 25 or on a separate server in communication with the proxy server 25.

Figure 10:
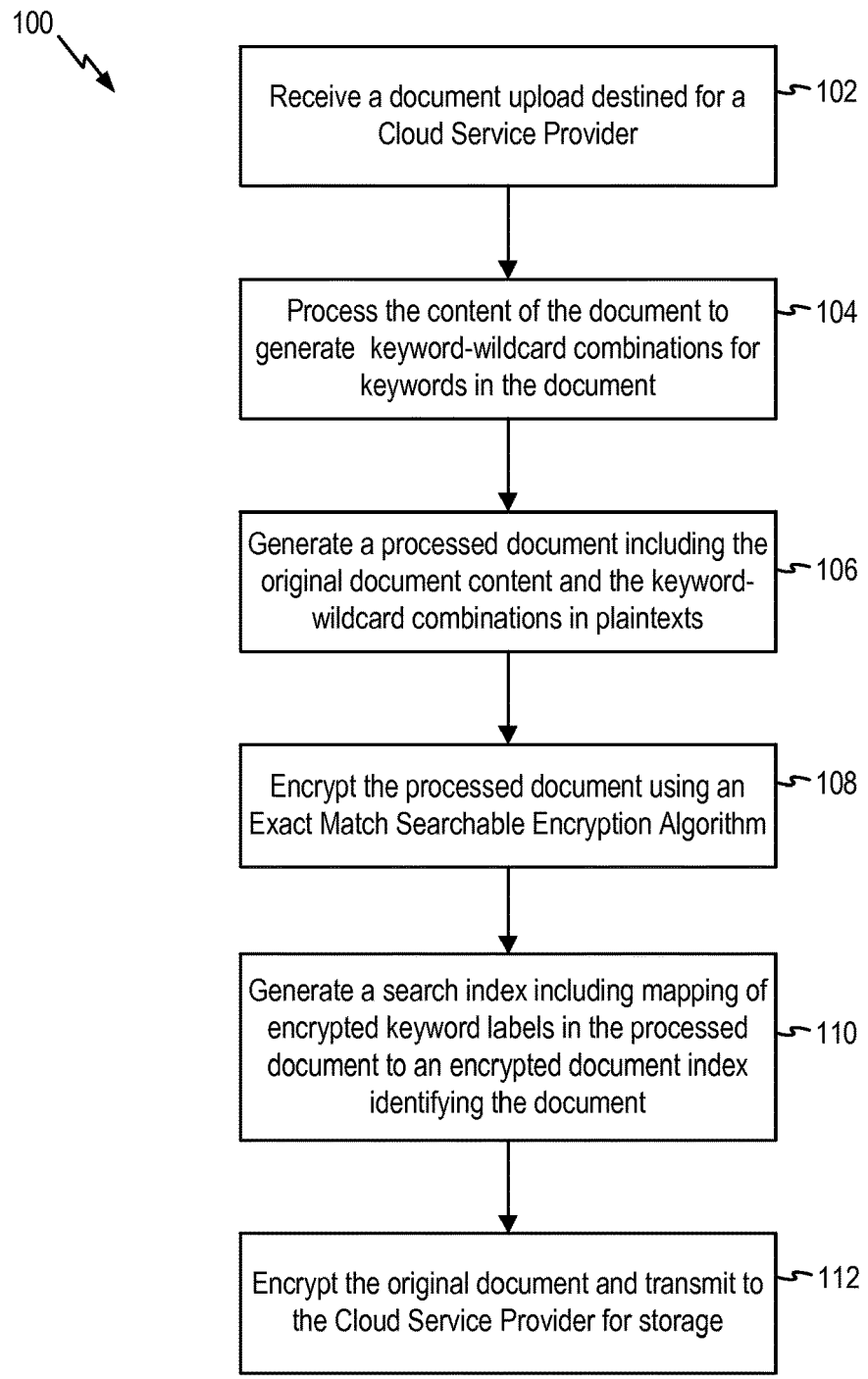
FIG. 10 is a flowchart illustrating the wildcard searchable encryption method which can be implemented in a proxy server in embodiments of the present invention.

Referring to FIGS. 9 and 10, the wildcard searchable encryption method 100 starts when a document upload destined for a cloud service provider is received at the proxy server 25 (102). The method 100 then processes the content of the document to generate keyword-wildcard combinations in plaintext for some or all of the keywords in the document (104). The keyword-wildcard combinations may include prefix combinations of the keywords and/or suffix combinations of the keywords, as described above. The method 100 generates a processed document including the original document content and the keyword-wildcard combinations in plaintext attached or appended thereto (106). Then, the method 100 encrypts the processed document using an exact match searchable encryption algorithm (108). The method 100 generates or updates a search index stored with the proxy server 25 (110). The method 100 stores in the search index a mapping of the encrypted keyword labels of the processed document to an encrypted document index identifying the document being encrypted. More specifically, the search index includes the encrypted keywords in the original content of the processed document and the encrypted keyword-wildcard combinations added to processed document from the pre-processing step. Finally, the method 100 encrypts the document and transmits the encrypted document to the cloud service provider 30 for storage (112). In some embodiments, the method 100 encrypts the original document using an encryption algorithm using a secret key K known only to the user or the enterprise to which the user belongs. In one example, the encryption algorithm for encrypting the original document is an AES256-GCM authenticated encryption. It is instructive to note that the document being encrypted and stored on the cloud service provider is the original document, without the keyword-wildcard combinations added by the preprocessing of the method 100 of the present invention.

Figure 11:
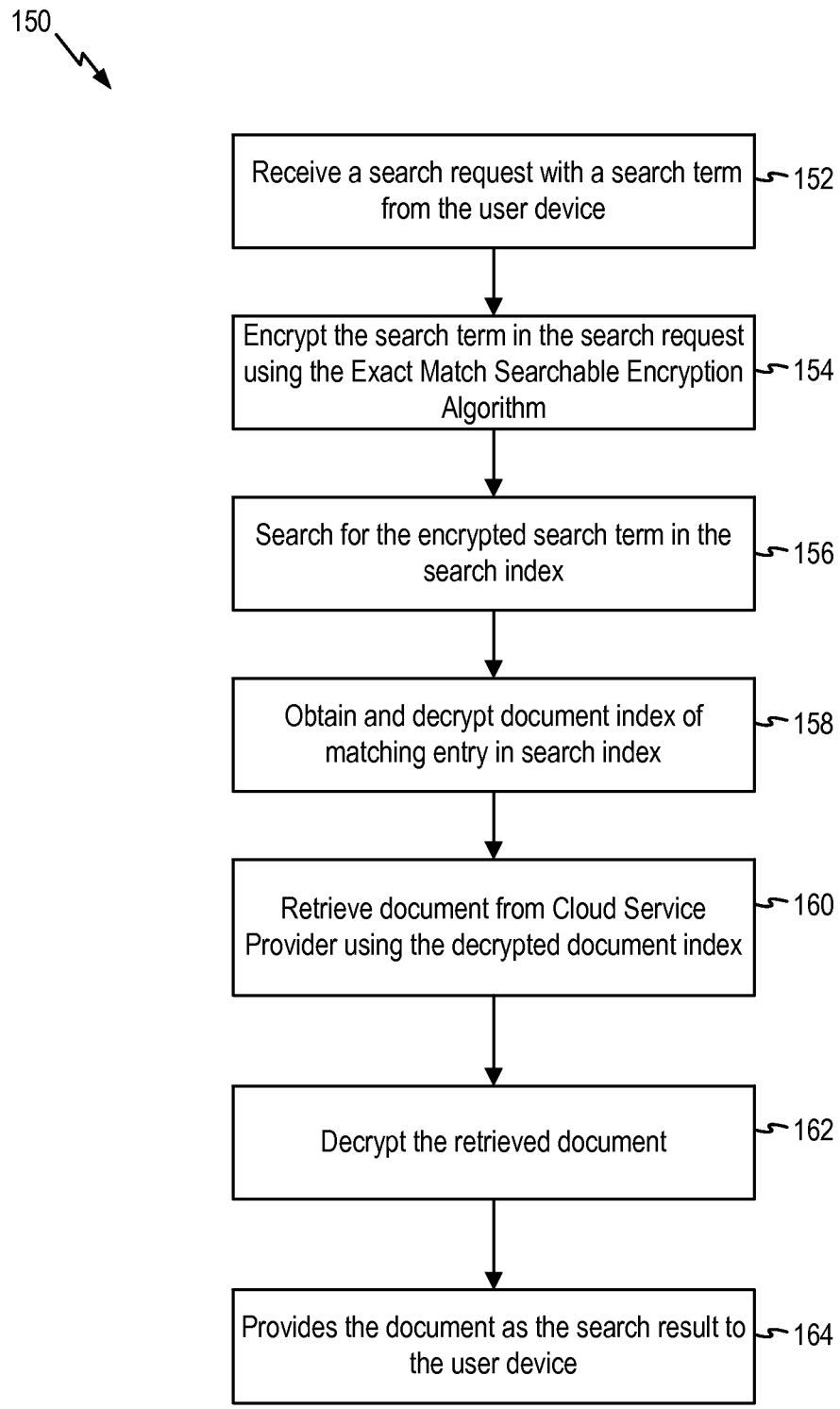
FIG. 11 is a flowchart illustrating a method for executing a search using the proxy server of FIG. 9 in embodiments of the present invention.

FIG. 11 is a flowchart illustrating a method for executing a search using the proxy server of FIG. 9 in embodiments of the present invention. Referring to FIGS. 9 and 11, a method 150 provides the process for executing a search of a cloud-stored encrypted document using the proxy server 25 including the encryption system 28. The method 150 receives a search request with a search term at the proxy server 25 from the user device 18 (152). In particular, the user device executes a search request for a document that is stored on the cloud service provider. The user device's search request is intercepted by the network proxy server. Accordingly, the search request is received by the method 150 at the network proxy server 25.

Upon receiving the search request, the method 150 encrypts the search term in the search request (154). The search term is encrypted using the same exact match searchable encryption algorithm used previously to generate the search index. The method 150 then searches for the encrypted search term in the search index stored with the proxy server 25 (156). At 158, the method 150 obtains encrypted document index of the matching entry in the search index and decrypts the encrypted document index. In particular, one or more document indexes associated with the matched encrypted search term may be obtained from the search index. In other cases, when no match is found, no document index is returned and the search result is nil and. At 160, the method 150 retrieves the encrypted document from the cloud service provider using the decrypted document index. The network proxy server 25 decrypts the document using the encryption algorithm previously used (162). The decoded or unencrypted document is then provided to the user device as the search result (164).

In the above-described embodiments, the set of keyword-wildcard combinations is appended to the document and encrypted together with the original document using an exact match searchable encryption algorithm. The set of keyword-wildcard combinations can be appended to the head or to the tail of the original document. The exact location where the set of keyword-wildcard combination is being appended or attached is not critical to the practice of the present invention.

In the above-described embodiments, the wildcard searchable encryption method is implemented in a network intermediary. In other embodiments, the wildcard searchable encryption method can be implemented in a network server which communicates with a cloud service without a network intermediary. The search index may be stored on the network server while the encrypted documents are stored on the cloud service. In some embodiments, the wildcard searchable encryption method may be implemented as an agent on a user device to process a document to include the set of keyword-wildcard combination so as to enable wildcard searching of the encrypted documents.

Figure 12:
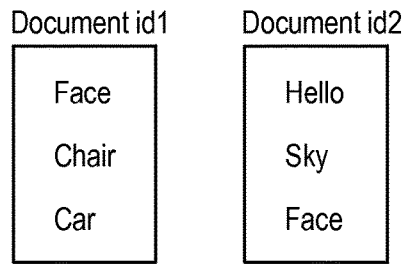
FIG. 12 illustrates the operation of an exact match searchable encryption algorithm in generating an encrypted search index in embodiments of the present invention.
Figure 12:
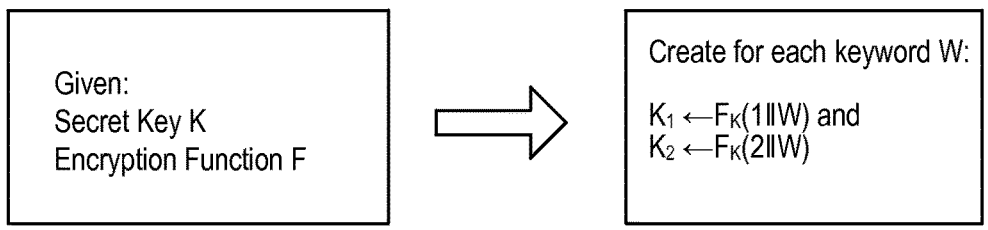

FIG. 12 illustrates the operation of an exact match searchable encryption algorithm in generating an encrypted search index in embodiments of the present invention. In embodiments of the present invention, the exact match searchable encryption algorithm described in FIG. 12 can be applied in the wildcard searchable encryption method described above to encrypt keywords and keyword-wildcard combinations to enable wildcard search of encrypted text in cloud-stored encrypted documents. In some embodiments, the exact match searchable encryption algorithm described in FIG. 12 can be implemented in a proxy server or a network intermediary implementing the wildcard searchable encryption method of the present invention on behalf of an enterprise, such as proxy server 25 in FIG. 9.

Referring to FIG. 12, the present example assumes that two documents id1 and id2, both containing the keyword "Face" among other keywords, are to be encrypted using the exact match searchable encryption algorithm ("the encryption algorithm"), such as algorithm 45 in FIG. 6, before being stored on a cloud service provider. The exact match searchable encryption algorithm generates a search index 250 as a result of the encryption process. To encrypt the documents on behalf of an enterprise or on behalf of a user of the enterprise, a secret key K belonging to the enterprise and known only to the enterprise is provided. For example, the secret key K can be a random key generated from some space K. Using the secret key K and a variable-input-length pseudorandom function F, the encryption algorithm derives a pair of per-keyword keys $K_1$ and $K_2$ for each keyword W. The keys $K_1$ and $K_2$ are used to compute pseudorandom labels and to encrypt the document index or document identifier for use in the search index 250. In the present description, "pseudorandom labels" refer to the encrypted keyword labels described above in FIGS. 5 and 8.

More specifically, in some examples, for each keyword W in the documents, the keys $K_1$ and $K_2$ are derived using the secret key K and the pseudorandom function F as follows:

$K_1 \leftarrow F_K(1\|W)$; and $K_2 \leftarrow F_K(2\|W)$, where the symbol "||" denotes the concatenate operation. For example, "1||W" denotes the string of "1" concatenated with W, resulting in a string "1W".

The keys $K_1$ and $K_2$ thus generated contain information relating to the keyword W. In some examples, the key $K_1$ is used to compute the pseudorandom label to use as the encrypted keyword label and the key $K_2$ is used to encrypt the document index.

Because two or more documents may contain the same keyword W, different encrypted keyword labels are computed for each occurrence of the keyword W in different documents so as to avoid leaking information relating to the frequency of the keyword W. As such, for each keyword W, the key $K_1$ and the pseudorandom function F are used to compute a pseudorandom label by applying the pseudorandom function F to a counter value N. The counter value N starts at 1 and increments for each occurrence of the keyword W in a different document. In this manner, different pseudorandom labels are computed for each occurrence of the same keyword in the search index.

For example, in a first document id1 with the keyword W, a first pseudorandom label is generated as $F_{K_1}(1)$ which is computed using the counter value of 1 applied to the pseudorandom function F and using the key $K_1$. Meanwhile, the document index "id1" for the first document is encrypted using the key $K_2$. An entry in the search index is then made by mapping the first pseudorandom label $F_{K_1}(1)$ to the encrypted document index $Enc_{K_2}(id1)$, as shown in FIG. 12.

As a further example, in a second document id2 with the keyword W, a second pseudorandom label is generated as $F_{K_1}(2)$ which is computed using the counter value of 2 applied to the pseudorandom function F and using the key $K_1$. Meanwhile, the document index "id2" for the second document is encrypted using the key $K_2$. An entry in the search index is then made by mapping the second pseudorandom label $F_{K_1}(2)$ to the encrypted document index $Enc_{K_2}(id2)$, as shown in FIG. 12.

Because the labels $F_{K_1}(1)$ and $F_{K_1}(2)$ are both generated from the same key $K_1$ which is a function of keyword W, both labels share the same key $K_1$ and so both labels inherently hide the same information relating to keyword W. However, the search index 250 as thus constructed is prevented from frequency analysis attack as the frequency of each keyword is masked by using different pseudorandom labels for each occurrence of the keyword W in a different document.

The search index 250 is thus built by the adding of entries of pseudorandom labels mapping to encrypted document index as each document is being encrypted for the enterprise. For example, when another document id4 contains the keyword W is encrypted, an entry in the search index 250 is made including the pseudorandom label $F_{K_1}(3)$ mapping to the encrypted document index $Enc_{K_2}(id4)$, as shown in FIG. 12.

For a different keyword Q, a separate set of keys $K_1$ and $K_2$ are derived using the keyword Q, the secret key K and the pseudorandom function F. In the present illustration, to distinguish between the different sets of keys $K_1$ and $K_2$, the keys for the keyword Q will be denoted as $K_{1'}$ and $K_{2'}$. The keys $K_{1'}$ and $K_{2'}$ thus contain information relating to the keyword Q. The encryption algorithm operates in the same manner to compute pseudorandom labels using the key $K_{1'}$ and to encrypt the document index using the key $K_{2'}$. For example, a third pseudorandom label is generated as $F_{K_{1'}}(1)$ which is computed using the counter value of 1 applied to the pseudorandom function F and using the key $K_{1'}$ for keyword Q. An entry in the search index is then made by mapping the third pseudorandom label $F_{K_{1'}}(1)$ to the encrypted document index $Enc_{K_{2'}}(id1)$ encrypted using the key $K_{2'}$, as shown in FIG. 12. Finally, when another occurrence of the keyword Q is found, a fourth pseudorandom label is generated as $F_{K_{1'}}(2)$ which is computed using the counter value of 2 applied to the pseudorandom function F and using the key $K_{1'}$ or keyword Q. An entry in the search index is then made by mapping the fourth pseudorandom label $F_{K_{1'}}(2)$ to the encrypted document index $Enc_{K_{2'}}(id4)$ encrypted using the key $K_{2'}$, as shown in FIG. 12.

As thus configured, the search index 250 can be stored using a generic dictionary data structure. No information is leaked from the search index as both the labels and the document index are encrypted.

Figure 13:
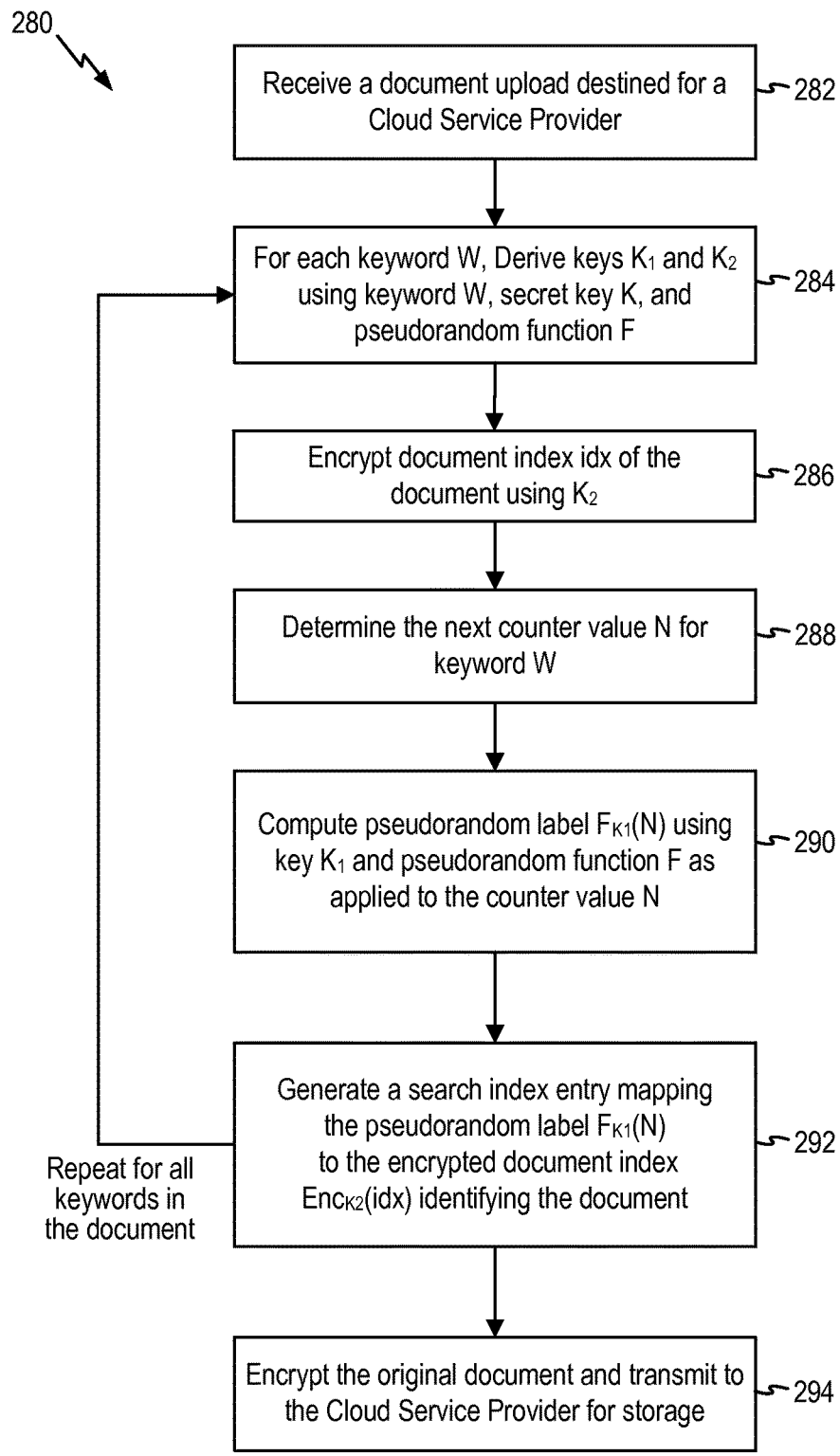
FIG. 13 is a flowchart illustrating an exact match encryption method for encrypting a document in embodiments of the present invention.

FIG. 13 is a flowchart illustrating an exact match encryption method for encrypting a document in embodiments of the present invention. In embodiments of the present invention, the exact match searchable encryption algorithm described in FIG. 13 can be applied in the wildcard searchable encryption method described above to encrypt keywords and keyword-wildcard combinations to enable wildcard search of encrypted text in cloud-stored encrypted documents. In some embodiments, the exact match searchable encryption algorithm described in FIG. 13 can be implemented in a proxy server or a network intermediary implementing the wildcard searchable encryption method of the present invention on behalf of an enterprise, such as proxy server 25 in FIG. 9.

Referring to FIG. 13, an exact match encryption method 280 ("encryption method 280) receives a document upload destined for a cloud service provider (282). The encryption method 280 derives, for each keyword W in the document, keys $K_1$ and $K_2$ using the keyword W, the secret key K associated with the enterprise and known only to the enterprise, and a pseudorandom function F (284). The encryption method 280 encrypts the document index idx of the document using the key $K_2$ (286). The encryption method 280 determines the next counter value N for the keyword W (288). The encryption method 280 then computes a pseudorandom label $F_{K1}(N)$ using the key $K_1$ and the pseudorandom function F as applied to the counter value N (290). The encryption method 280 then generates a search index entry mapping the pseudorandom label $F_{K1}(N)$, also referred to as the encrypted keyword label, to the encrypted document index $Enc_{K2}(idx)$ identifying the document (292). The encryption method 280 repeats steps 284 to 292 for all of the keywords in the documents. With the search index thus generated, the encryption method 280 encrypts the original document and transmits the encrypted document to the cloud service provider (294). In some embodiments, the method 280 encrypts the original document using an encryption algorithm with the secret key K. In one example, the encryption algorithm is an AES256-GCM authenticated encryption.

Figure 14:
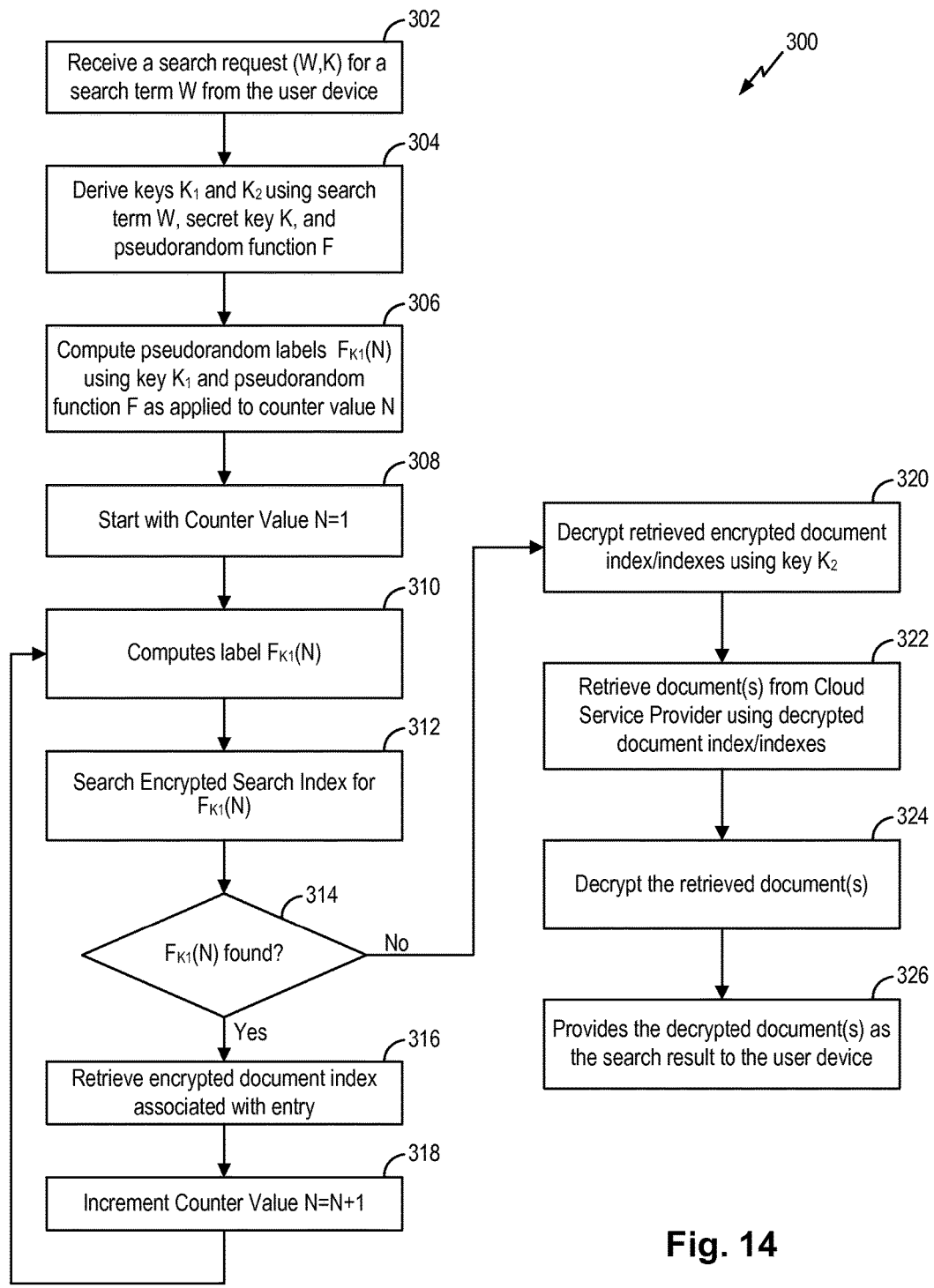
FIG. 14 is a flowchart illustrating a method for executing a search using the encrypted search index of FIG. 12 generated by an exact match searchable encryption algorithm in embodiments of the present invention.

FIG. 14 is a flowchart illustrating a method for executing a search using the encrypted search index of FIG. 12 generated by an exact match searchable encryption algorithm in embodiments of the present invention. Referring to FIG. 14, a method 300 provides the process for executing a search of cloud-stored encrypted documents using the encrypted search index 250 generated using the searchable encryption algorithm described in FIG. 12. The method 300 may be executed on a proxy server performing encryption of cloud stored documents on behalf of an enterprise, such as proxy server 25 in FIG. 9.

To perform a search, the method 300 receives a search request with a search term from the user device 18 (302). The search request may be received at a proxy server. In particular, the user device executes a search request for documents that are stored on the cloud service provider. The user device's search request may be intercepted by the network proxy server 25 (FIG. 9). Accordingly, the search request may be received by the method 300 at the network proxy server 25. The search request contains the search term W and also the secret key K belonging to the enterprise and known only to the enterprise.

Upon receiving the search request, the method 300 re-derives the keys $K_1$ and $K_2$ using the search term W, the secret key K and the pseudorandom function F (304). Using the key $K_1$, the method 300 re-computes pseudorandom labels $F_{K1}(N)$ associated with the search term W using the pseudorandom function F as applied to a counter value N (306). More specifically, the method 300 re-computes the pseudorandom label $F_{K1}(N)$ in an iterative process starting with the counter value N=1 and incrementing the counter value until no entry is found in the search index.

Referring to FIG. 14, the method 300 starts with a counter value of N=1 (308). The method 300 computes the pseudorandom label $F_{K1}(N)$ using the current N value (310). Accordingly, the method 300 computes the pseudorandom label $F_{K1}(N)$ using N=1 in this first iteration. The method 300 searches the encrypted search index for an entry matching the label $F_{K1}(N)$ (312). That is, in this first iteration, the method 300 searches in the search index for the label $F_{K1}(1)$. The method 300 determines whether an entry containing the label $F_{K1}(N)$ is found in the search index (314). When a match is found, the method 300 retrieves the encrypted document index associated with the entry (316). The method 300 then increments the counter value N (318) and the method returns to step 310 to compute the pseudorandom label $F_{K1}(N)$ using the current N value. In this second iteration, the counter value is now 2 and the pseudorandom label $F_{K1}(2)$ is computed. The method 300 continues to determine of the label $F_{K1}(2)$ is found in the search index and the method iterates when a match is found.

When the method 300 determines that a label $F_{K1}(N)$ is not found in the search index, the method 300 determines that all instances of the keyword W has been found and the method 300 proceeds to decrypt the retrieved encrypted document index or indexes using the key $K_2$ (320). The method 300 then retrieves the document(s) from the cloud service provider using the decrypted document index/indexes (322). The method 300 decrypts the retrieved document(s) (324) and provides the decrypted file(s) to the user device as the search result (326).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for wildcard searchable encryption of cloud stored data, comprising:
    receiving, at a network intermediary, a document destined for a cloud service provider;
    processing, at the network intermediary, the content of the document to generate a plurality of keyword-wildcard combinations in plaintext for some or all of the keywords in the document;
    generating a processed document including the original document content and the keyword-wildcard combinations in plaintext appended to the original document;
    encrypting the processed document using an exact match searchable encryption algorithm;
    generating one or more entries in a search index stored in the network intermediary, the one or more entries including a mapping of encrypted keyword labels to an encrypted document index identifying the document being encrypted, the encrypted keyword labels being generated using at least some keywords of the original document content and at least some keyword-wildcard combinations appended to processed document;
    encrypting the original document using a second encryption algorithm; and
    transmitting the encrypted document to the cloud service provider.

2. The method of claim 1, wherein processing, at the network intermediary, the content of the document to generate a plurality of keyword-wildcard combinations in plaintext for some or all of the keywords in the document comprises:

processing, at the network intermediary, the content of the document to generate the plurality of keyword-wildcard combinations in plaintext for some or all of the words in the document, each of the words in the document including one or more characters of the uppercase and lower case English alphabet, numbers 0-9, punctuation symbols, alphabet and symbols of languages other than English, and other ASCII characters.

3. The method of claim 1, wherein processing, at the network intermediary, the content of the document to generate a plurality of keyword-wildcard combinations in plaintext for some or all of the keywords in the document comprises:
processing the content of the document to generate a plurality of prefix combinations in plaintext for some or all of the keywords in the document.

4. The method of claim 3, wherein processing the content of the document to generate a plurality of prefix combinations in plaintext for some or all of the keywords in the document comprises:
processing the content of the document to generate the plurality of prefix combinations for a keyword including one or more leading characters of the keyword forming prefixes of the keyword, one or more remaining characters being a wildcard.

5. The method of claim 1, wherein processing, at the network intermediary, the content of the document to generate a plurality of keyword-wildcard combinations in plaintext for some or all of the keywords in the document comprises:
processing the content of the document to generate a plurality of suffix combinations in plaintext for some or all of the keywords in the document.

6. The method of claim 5, wherein processing the content of the document to generate a plurality of suffix combinations in plaintext for some or all of the keywords in the document comprises:
processing the content of the document to generate the plurality of suffix combinations for a keyword including one or more trailing characters of the keyword forming suffixes of the keyword, one or more remaining characters being a wildcard.

7. The method of claim 1, wherein generating a processed document including the original document content and the keyword-wildcard combinations in plaintext appended to the original document comprises:
appending the keyword-wildcard combinations in plaintext to the tail of the original document content.

8. The method of claim 1, wherein encrypting the original document using the second encryption algorithm comprises:
encrypting the original document using a bulk encryption algorithm.

9. The method of claim 1, further comprising:
receiving, at the network intermediary, a search request with a search term;
generating a search term label using the search term in the search request being applied to the exact match searchable encryption algorithm;
searching for the search term label in the search index;
in response to the search term label matching an encrypted keyword label in the search index, retrieving from the search index the encrypted document index mapped to the matching encrypted keyword label;
decrypting the retrieved encrypted document index;
retrieving the encrypted document from the cloud service provider using the decrypted document index;
decrypting the retrieved document; and
providing the decrypted document as the search result.

10. The method of claim 1, wherein receiving, at the network intermediary, the document destined for the cloud service provider comprises:
receiving, at the network intermediary, the document destined for the cloud service provider, the document comprising one of a file, a data record, a data field, a data with structured data format, or a data with unstructured data format.

11. A system for wildcard searchable encryption of cloud stored data, comprising:
a memory;
a hardware processor coupled to the memory and configured to receive a document destined for a cloud service provider, to process the content of the document to generate a plurality of keyword-wildcard combinations in plaintext for some or all of the keywords in the document, to generate a processed document including the original document content and the keyword-wildcard combinations in plaintext appended to the original document, to encrypt the processed document using an exact match searchable encryption algorithm, to generate one or more entries in a search index stored in the network intermediary, the one or more entries including a mapping of encrypted keyword labels to an encrypted document index identifying the document being encrypted where the encrypted keyword labels are generated using at least some keywords of the original document content and at least some keyword-wildcard combinations appended to processed document, to encrypt the original document using a second encryption algorithm, and to transmit the encrypted document to the cloud service provider.

12. The system of claim 11, wherein the hardware processor is further configured to process the content of the document to generate a plurality of keyword-wildcard combinations in plaintext for some or all of the words in the document, each of the words in the document including one or more characters of the uppercase and lower case English alphabet, numbers 0-9, punctuation symbols, alphabet and symbols of languages other than English, and other ASCII characters.

13. The system of claim 11, wherein the hardware processor is further configured to process the content of the document to generate a plurality of prefix combinations in plaintext for some or all of the keywords in the document.

14. The system of claim 13, wherein the hardware processor is further configured to process the content of the document to generate the plurality of prefix combinations in plaintext for a keyword including one or more leading characters of the keyword forming prefixes of the keyword, one or more remaining characters being a wildcard.

15. The system of claim 11, wherein the hardware processor is further configured to process the content of the document to generate a plurality of suffix combinations in plaintext for some or all of the keywords in the document.

16. The system of claim 15, wherein the hardware processor is further configured to process the content of the document to generate the plurality of suffix combinations in plaintext for a keyword including one or more trailing characters of the keyword forming suffixes of the keyword, one or more remaining characters being a wildcard.

17. The system of claim 11, wherein the hardware processor is further configured to append the keyword-wildcard combinations in plaintext to the tail of the original document content.

18. The system of claim 11, wherein the hardware processor is further configured to encrypting the original document using a bulk encryption algorithm.

19. The system of claim 11, wherein the hardware processor is further configured to receive a search request with a search term, to generate a search term label using the search term in the search request being applied to the exact match searchable encryption algorithm, to search for the search term label in the search index, in response to the search term label matching an encrypted keyword label in the search index, to retrieve from the search index the encrypted document index mapped to the matching encrypted keyword label, to decrypt the retrieved encrypted document index, to retrieve the encrypted document from the cloud service provider using the decrypted document index, to decrypt the retrieved document, and to provide the decrypted document as the search result.

20. The system of claim 11, wherein the hardware processor is further configured to receive the document destined for the cloud service provider, the document comprising one of a file, a data record, a data field, a data with structured data format, or a data with unstructured data format.

* * * * *